United States Patent [19]

Brackbill et al.

[11] 4,097,001
[45] Jun. 27, 1978

[54] DETACHABLE WEAR PLATE FOR A FLAIL-TYPE MATERIAL SPREADER

[75] Inventors: Warren H. Brackbill, Paradise; William F. Ostergren, Terre Hill, both of Pa.

[73] Assignee: Sperry Rand Corporation, New Holland, Pa.

[21] Appl. No.: 763,168

[22] Filed: Jan. 27, 1977

[51] Int. Cl.² .................................. A01C 3/06
[52] U.S. Cl. ................................... 239/658
[58] Field of Search .......................... 239/658

[56] References Cited
U.S. PATENT DOCUMENTS

| 3,258,270 | 6/1966 | Ferris | 239/658 |
| 3,556,413 | 1/1971 | Lindgren | 239/658 |
| 3,610,473 | 10/1971 | Hochstetler | 239/658 X |
| 3,856,210 | 12/1974 | Hodgson | 239/658 |

Primary Examiner—Robert W. Saifer
Attorney, Agent, or Firm—John B. Mitchell; Frank A. Seemar; Joseph A. Brown

[57] ABSTRACT

An L-shaped elongated discharge edge is integrally formed on the tank wall of a flail-type material spreader thereby providing structural rigidity to the wall as well as serving as a mounting for a detachable wear absorbing plate. The wear absorbing plate is positioned on the elongated discharge edge with its inner portion inwardly of the sidewall of the tank such that the heads of the flails shall strike the wear plate as the flails elongate due to wear to thereby protect the spreader from structural damage.

6 Claims, 4 Drawing Figures

DETACHABLE WEAR PLATE FOR A FLAIL-TYPE MATERIAL SPREADER

BACKGROUND OF THE INVENTION

1. Field of the Invention

The present invention relates to flail-type material spreaders and, more particularly, is directed toward detachably mounting a wear absorbing member on an integrally formed elongated discharge edge of the tank.

2. Description of the Prior Art

Flail-type material spreaders are relatively new; however, many improvements have been made upon these spreaders during the past decade. The general construction of the flail-type spreaders, as exemplified in U.S. Pat. No. 3,414,199, that issued to Robert G. Ferris on Dec. 3, 1968, comprises a wheeled frame that supports a holding tank which is essentially the bottom half of a cylinder, a material distributing mechanism including a longitudinally extending rotatable shaft or rotor disposed on the axis of the cylinder and a plurality of flail members axially disposed along the shaft, and a semi-cylindrical shaped hood attached to one edge of the wall and extending over the tank in defining a discharge opening through which material stored within the tank is discharged. The rotary power for driving the shaft and flails is provided through suitable gearing, by the power takeoff shaft of the towing tractor.

The semi-cylindrical shaped holding tank is generally rolled from sheet steel and for providing structural rigidity thereto, a longitudinally extending brace, such as the angle iron in the aforesaid patent, is welded along the elongated discharge edge. In other similar flail-type spreaders a structural reinforcing brace is also welded on the edge of the tank opposite the discharge edge to support an overlying hood. Such structural braces and the required welding thereof adds additional cost to the spreader, besides, increasing the manufacturing time.

The unloading flail members are usually of the chain type having a cupped or L-shaped head interconnected to the rotor shaft by a short length of chain. The flails are arranged along the shaft in various arrays, the simpliest being a single row of flail along one side of the rotor. Other arrangements include two aligned or offset rows of flails connected on opposite sides of the shaft or three or four flail rows attached to the shaft at 120° and 90° intervals respectively. Upon rotation of the shaft, the flails extend radially outwardly due to the centrifugal force, the flail heads moving along a path adjacent the inside periphery of the tank wall whereby the material within the tank is scooped up and discharged over the elongated discharge edge.

The flails are rotated at a very high velocity and after a given period of use, the links of the flail chains wear resulting in an elongation of the flails. Once the flails elongate beyond a predetermined length (generally the radius of curvature) they will contact the wall of the spreader. Generally, due to their rotational direction, the flail heads will first strike the discharge edge and thereafter carve into the main body of the wall. If adjustments are not made to shorten the length of the chains, continued operation of the spreader will result in severe damage, if not total destruction, to the tank necessitating extensive and costly repairs.

SUMMARY OF THE INVENTION

The present invention overcomes the aforementioned disadvantages of the prior art flail-type material spreaders by providing an improved tank structure having an integrally formed elongated discharge edge that not only reinforces the tank but also detachably mounts a wear absorbing member which can be easily replaced to thereby extend the useful life of the spreader.

Accordingly, the present invention relates to a flail-type material spreader which includes a tank having an arcuate shaped wall with an upper elongated discharge edge and a material discharge mechanism within the tank and operable for propelling material from within the tank over the discharge edge. The discharge mechanism includes a rotatable shaft having a plurality of flail members attached thereto which, upon rotation of the shaft, are extensible in response to the centrifugal force and move about a path adjacent the periphery of the tank wall to propel material stored within the tank and discharge the same over the elongated discharge edge. The improvement provided by the present invention is in the form of a wear absorbing member detachably mounted on the elongated discharge edge to protect the tank from contact with the flail members as the members elongate due to wear.

More particularly, the wear absorbing member is detachably mounted on the discharge edge and has an inner portion positioned inwardly of the side wall of the tank such that the flail members contact the wear absorbing member as the flail members elongate due to wear to thereby prevent damage to the spreader. Another portion of the wear absorbing member slopes upwardly and outwardly from the inner portion so as to provide a surface which directs non-discharged material residue back into the tank. Specifically, the wear absorbing member is detachably mounted by fastener elements thereby providing ready replacement of the same.

The discharge edge is integrally formed on and along the sidewall of the tank and is preferably L-shaped to thereby provide structural rigidity to the tank as well as serving as a means for detachably mounting the wear absorbing member.

These and other advantages and attainments of the present invention will become apparent to those skilled in the art upon reading of the following detailed description when taken in conjunction with the drawings wherein there is shown and described an illustrative embodiment of the invention.

BRIEF DESCRIPTION OF THE DRAWINGS

In the course of the following detailed description, reference will be frequently made to the attached drawings in which.

DETAILED DESCRIPTION OF THE INVENTION

In the following description, right hand and left hand references are determined by standing at the rear of the machine facing in a direction of forward travel. Also, in the following description, it is to be understood that such terms as "forward," "rearward," "left," "upwardly," etc., are words of convenience and are not to be construed as limiting terms.

IN GENERAL

Figure 1:
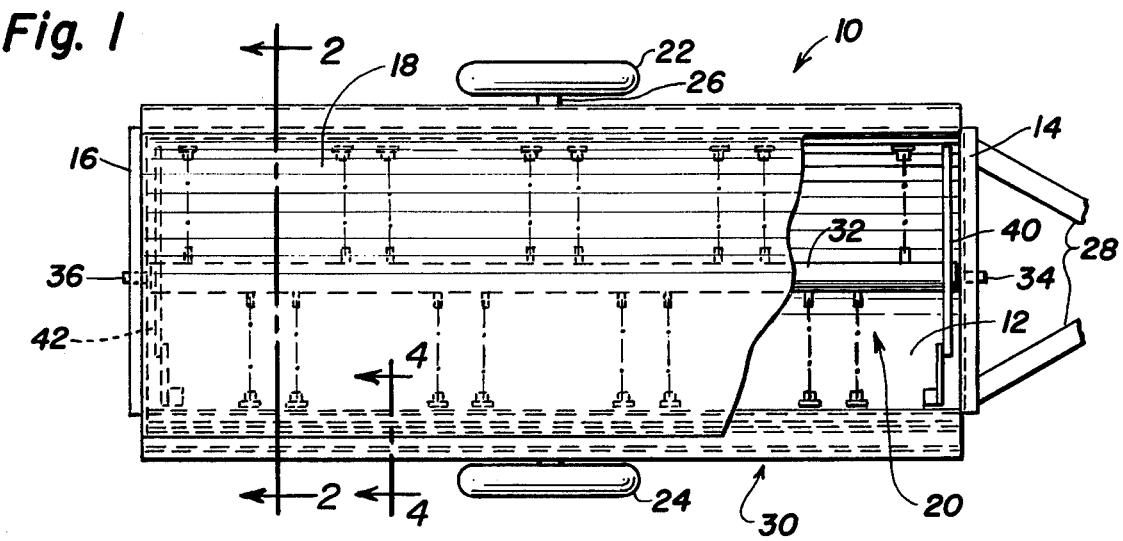
FIG. 1 is a top plan view of a flail-type material spreader embodying the present invention, the flails being shown by dashed lines in an extended position and a portion of the hood of the spreader being broken away.

Referring now to the drawings, and particularly to FIG. 1, there is shown a flail-type material spreader, being indicated generally by the numeral 10, which incorporates the preferred embodiment of the present invention.

The spreader 10 comprises a generally semi-cylindrical tank 12, having front and rear wall 14, 16 respectively, a hood 18 partially covering the tank 12, and a material discharging mechanism 20 which is operable to discharge material stored within the tank. The tank 12 is supported on a wheeled frame (not shown) having left and right ground engaging wheels 22, 24 rotatably mounted on the opposite ends of a transverse axle 26. A towing tongue 28, partially shown in FIG. 1, is secured to the front of the frame and projects forwardly therefrom for connection to a tractor (not shown) which tows the spreader across the fields and which also supplies the necessary power, through drive means not shown, for driving the discharge mechanism 20 whereby material is discharged through the discharge opening defined by the hood 18 and the upper elongated discharge edge 30.

The material discharge mechanism 20 includes a longitudinally extending rotor 32 having respective front and rear stub-shafts 34, 36 which are journalled for rotation in bearings (not shown) carried by the front and rear walls 14, 16. The rotor 32 is axially and centrally disposed within the tank 12 and carries a plurality of flails, generally indicated by the numeral 38, in addition to, front and rear starter elements 40, 42 respectively. Briefly, the starter elements 40, 42 comprise a flat rigid bar extending radially outwardly from the opposite sides of rotor 32. A thorough appreciation of the starter elements 40, 42 can be gained from a reading of U.S. Pat. No. 3,980,239. Each of the flails 38 include a flail head 44 which is attached to one end of a short flexible member, such as chain 46, whose other end is attached to a tab 48 that is secured to the rotor 32. In the preferred embodiment, diametrically opposed pairs of tabs 48 are spaced longitudinally along the rotor 32. Upon rotation of the rotor 32, the flails 38 extend outwardly from the axis of the rotor such that the flail heads 44 move about a path adjacent the inner surface of the semi-cylindrical tank 12 as indicated by the dashed lines in FIG. 2. The construction thus far described is substantially conventional and need not be dealt with in greater detail for a proper understanding of the invention.

REPLACEABLE WEAR ABSORBING MEMBER

As mentioned above, the flails 38, over an extended period of use, elongate due to wear in the chains 46 thereby resulting in the flail heads 44 traveling along a path of revolution which continues to increase in diameter until the heads 44 contact the tank. Due to the rotational direction of the flails 38 (counterclockwise as indicated by the arrows in FIG. 2), the heads 44 will first strike the discharge edge 30 of the tank 12 and then bounce inwardly; however, if continued use of the spreader under such circumstances takes place, the heads 44 will eventually carve out a groove in the tank wall thereby resulting in structural damage to the tank which will necessitate extensive and costly repairs to the spreader or its replacement.

Figure 2:
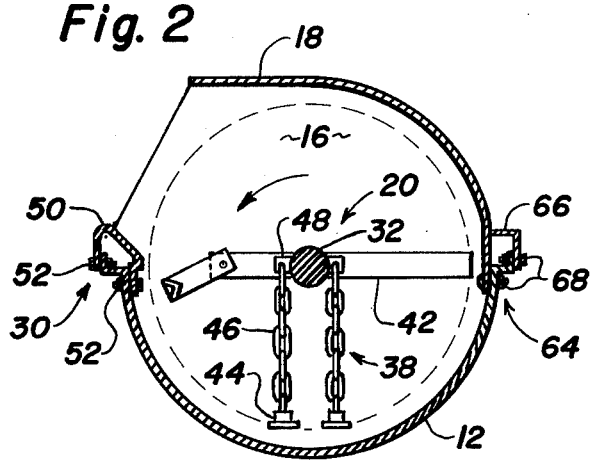
FIG. 2 is a sectional view taken along line 2—2 of FIG. 1, the flails being shown in a downward relaxed position for clarity.
Figure 4:
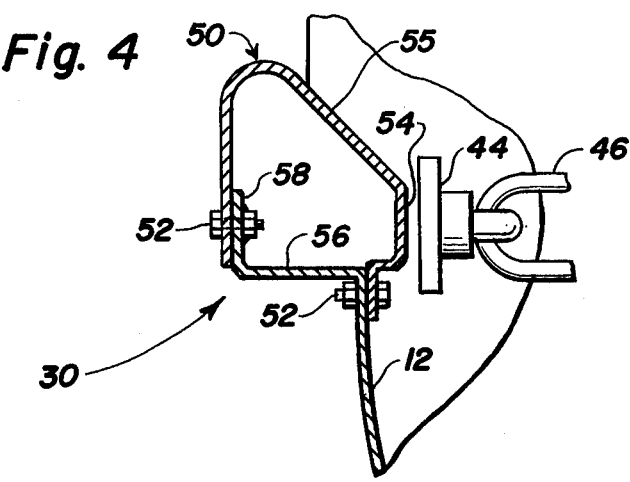
FIG. 4 is an enlarged sectional view taken along line 4—4 of FIG. 1 showing in more detail the mounting of the wear absorbing member on the integrally formed elongated discharge edge of the spreader.

Thus, in accordance with the principles of the present invention, the spreader 10 is provided with a replaceable wear absorbing member or plate 50 to obviate the aforementioned problems. As best seen in FIGS. 2 and 4, the wear plate 50 is detachably mounted on the elongated discharge edge 30 by fastener elements 52 and is so positioned thereon such that its inwardmost portion 54 projects inwardly over the inner surface of the tank wall 12. Also, another portion 55 of the wear plate 50 slopes upwardly and outwardly from portion 54 so as to provide a surface which directs non-discharged residue material back into the tank 12. It can be readily appreciated from the positioning of the wear plate 50, as seen in FIGS. 2 and 4, that as the flails 38 elongate due to wear, the flail heads 44 will first strike wear plate 50, thereby preventing structural damage to the tank wall 12.

Preferably, the elongated discharge edge 30 is integrally formed on the tank wall and is L-shaped (see FIG. 4) having its horizontal leg 56 projecting outwardly from the sidewall and its vertical leg 58 projecting upwardly from the outer edge of the horizontal leg 56. Such particularly shaped integrally formed elongated discharge edge 50 not only provides a suitable support for detachably mounting the wear plate 50 but also structurally reinforces tank 12.

Figure 3:
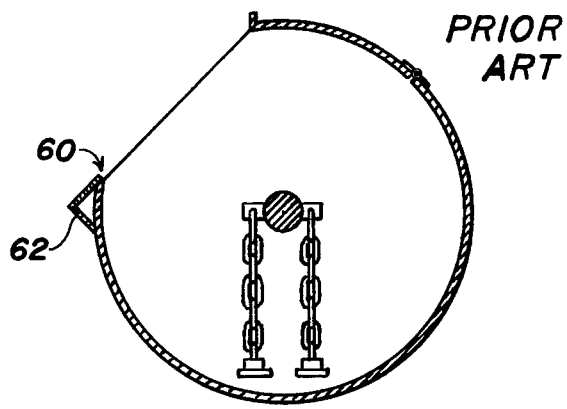
FIG. 3 is a sectional view similar to FIG. 2, of a prior art structure showing the elongated discharge edge with a reinforcing structural angle iron member welded to and extending along the discharge edge.

FIG. 3 shows the prior art version of a flail-type spreader having a discharge edge over which the construction of the present invention is an improvement. As illustrated, the discharge edge 60 is provided with a reinforcing angle iron 62 which is welded to and longitudinally extends along the outer side of the edge 60. In addition to being an extra component to the prior art spreader which would add to its cost, the reinforcing angle iron 62 would also increase the manufacturing time of the spreader due to the time necessary to weld the member 62 to the tank.

Again, referring to FIG. 2, it is seen that the edge 64 which supports the hood 18 has a similar integrally formed L-shaped configuration, but opposite to that of the discharge edge 50. Secured to the hood 18 is a longitudinally extending downwardly facing L-shaped bracket 66 that mates with edge 64. The hood 18 is detachably attached to edge 64 by fastener elements 68 and when so assemblied, a rigid box beam as shown is formed, thereby providing additional rigid structural support to spreader 10.

It is thought that the improved wear absorbing plate and its positioning provided by the elongated discharge edge of the present invention and many of its attendant advantages will be understood from the foregoing description and it will be apparent that various changes may be made in form, construction and arrangement of the parts without departing from the spirit and scope of the invention or sacrificing all of its material advantages, the form hereinbefore described being merely a preferred or exemplary embodiment thereof.

Having thus described the invention, what is claimed is:

1. In a flail-type material spreader of the kind having a partially open topped tank with an arcuate-shaped wall and an upper elongated discharge edge, a material discharge mechanism mounted within said tank operable to propel material from within said tank over said discharge edge, said mechanism including rotatable shaft means and a plurality of flail members connected thereto and extensible therefrom in response to the generation of centrifugal force by the rotation of said shaft means, said flail members traveling in a substantially circular path adjacent the inner circumference of said wall and said discharge edge, wherein the improvement comprises:

a wear absorbing member detachably mounted to said discharge edge, said wear absorbing member having at least a first and a second portion, said first portion being disposed inwardly from said wall towards said rotatable shaft means, said second portion sloping upwardly and outwardly from said first portion so as to provide a surface that directs non-discharged material residue back into said tank.

2. In combination with a flail-type material spreader of the kind wherein a partially open topped tank has an arcuate-shaped wall with an upper elongated discharge edge, a material discharge mechanism mounted within operable to propel material from within said tank over said discharge edge, said mechanism including rotatable shaft means and a plurality of flail members connected thereto and extensible therefrom in response to the generation of centrifugal force by the rotation of said shaft means, said flail members traveling in a substantially circular path adjacent the inner circumference of said wall and said discharge edge, wherein the improvement comprises:

said elongated discharge edge being integrally formed on the uppermost portion of said wall and extending outwardly a short distance therefrom and then upwardly a short distance.

3. In combination with a flail-type material spreader of the kind wherein a partially open topped tank has an arcuate-shaped wall with an upper elongated discharge edge, an opposing tank edge, a material discharge mechanism mounted within operable to propel material from within said tank over said discharge edge, said mechanism including rotatable shaft means and a plurality of flail members connected thereto and extensible therefrom in response to the generation of centrifugal force by the rotation of said shaft means, said flail members traveling in a substantially circular path adjacent the inner circumference of said wall and said discharge edge, wherein the improvement comprises:

said elongated discharge edge and said opposing tank edge each being L-shaped in cross-section with a vertical leg thereof being positioned outwardly from said wall.

4. The flail-type spreader as described in claim 3, further comprising a detachably mounted hood extending at least partially over said tank, said hood having a downwardly facing L-shaped bracket mounted longitudinally along the edge of said hood for attaching the same on said opposing tank edge, said bracket and said opposing tank edge forming a box-shaped beam which adds structurally rigidity to said spreader when said hood is detachably mounted on said opposing tank edge.

5. In combination with a flail-type material spreader of the kind wherein a partially opened topped tank has an arcuate-shaped wall with an upper L-shaped elongated discharge edge, a material discharge mechanism mounted within operable to propel material from within said tank over said discharge edge, said mechanism including rotatable shaft means and a plurality of flail members connected thereto and extensible therefrom in response to the generation of centrifugal force by the rotation of said shaft means, said flail members travelling in a substantially circular path adjacent the inner circumference of said wall and said discharge edge, wherein the improvement comprises:

a detachable wear absorbing member curved such that its outer portion overlaps the vertical leg of said L-shaped discharge edge and extends upwardly therefrom and then slopes inwardly and downwardly a short distance and therefrom generally vertically downwardly and then horizontally outwardly a short distance and therefrom vertically downwardly adjacent the inner surface of said wall.

6. In combination with a flail-type material spreader of the kind wherein a partially open topped tank has an arcuate-shaped wall with an upper elongated discharge edge, a material discharge mechanism mounted within operable to propel material from within said tank over said discharge edge, said mechanism including rotatable shaft means and a plurality of flail members connnected thereto and extensible therefrom in response to the generation of centrifugal force by the rotation of said shaft means, said flail members travelling in a substantially circular path adjacent the inner circumference of said wall and said discharge edge, wherein the improvement comprises:

a detachable wear absorbing member having at least one portion disposed inwardly from said inner circumference of said wall such that upon rotation of said shaft means said flail members strike said wear absorbing member and not said wall thereby preventing damage to said wall in the event of wear elongation occurring in said flail members.

* * * * *